(12) United States Patent
Flattin et al.

(10) Patent No.: US 8,122,456 B2
(45) Date of Patent: Feb. 21, 2012

(54) MICROCIRCUIT CARD COMPRISING MEANS FOR PUBLISHING ITS COMPUTER OBJECTS

(75) Inventors: David Flattin, Suresnes (FR); Christophe Louis, Orsay (FR); Javier Contreras, Madrid (ES)

(73) Assignee: Oberthur Technologies, Levallois-Perret (FR)

( * ) Notice: Subject to any disclaimer, the term of this patent is extended or adjusted under 35 U.S.C. 154(b) by 1030 days.

(21) Appl. No.: 10/533,772

(22) PCT Filed: Oct. 31, 2003
(Under 37 CFR 1.47)

(86) PCT No.: PCT/FR03/03257
§ 371 (c)(1),
(2), (4) Date: Jun. 22, 2006

(87) PCT Pub. No.: WO2004/042572
PCT Pub. Date: May 21, 2004

(65) Prior Publication Data
US 2006/0266843 A1  Nov. 30, 2006

(30) Foreign Application Priority Data
Nov. 4, 2002  (FR) ..................... 02 13750

(51) Int. Cl.
*G06F 9/22* (2006.01)
(52) U.S. Cl. .............. 719/315; 719/330; 726/9; 726/12

(58) Field of Classification Search ........................ None
See application file for complete search history.

(56) References Cited

U.S. PATENT DOCUMENTS

| 6,698,654 | B1* | 3/2004 | Zuppicich ..................... 235/380 |
| 6,807,561 | B2* | 10/2004 | Lagosanto et al. ............ 709/203 |
| 7,127,605 | B1* | 10/2006 | Montgomery et al. ....... 713/150 |
| 2002/0082847 | A1* | 6/2002 | Vandewalle et al. ............. 705/1 |
| 2004/0154027 | A1* | 8/2004 | Vandewalle et al. .......... 719/330 |

FOREIGN PATENT DOCUMENTS

| EP | 0753816 | 1/1997 |
| EP | 0964370 | 12/1999 |

OTHER PUBLICATIONS

Jean-Jacques Vandewalle, New RMI Extension to the Java Card 2.1 API, 2001, Worldwide Java Developer Conference. pp. 15-17.*
Christophe Rippert, An evaluation of the Java Card environment, Nov. 16, 2001, p. 1-6.*

(Continued)

*Primary Examiner* — Lechi Truong
*Assistant Examiner* — Syed Roni
(74) *Attorney, Agent, or Firm* — Young & Thompson

(57) ABSTRACT

The invention concerns a microcircuit card including at least one computer object and a register (Registry) having a logic identifier (myCalculator) of the object and at least one local reference (A000000000H,0060H) of the object pertaining to the card. The card further includes elements (CardManager) adapted to communicate, upon reception of a first message (look_APDU) including the logic identifier (myCalculator), at least one local code (K(0060H)) obtained from the local reference (0060H).

20 Claims, 1 Drawing Sheet

OTHER PUBLICATIONS

Figure 1:
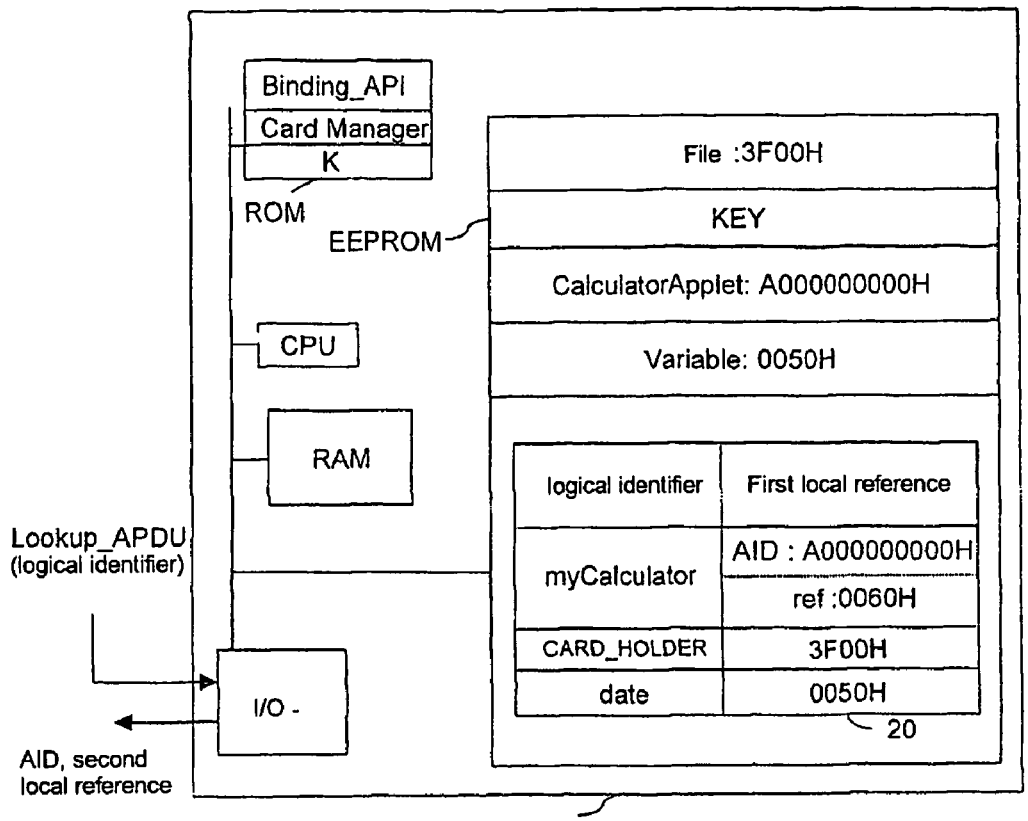

Vandewalle, Jean-Jacques: "Developing and deploying Java Card Applications" Gemplus Software Research Labs, 'Online! 2001, pp. 1-23, XP002317561 Extrait de l'Internet: URL:http://rangiroa.essifr/cours/car/02-javacard-jini.pdf> 'extrait le Feb. 14, 2005! p. 16-p. 22, p. 19.

MacAire, Alain: "Service Registry for Open Smart Cards" Gemplus Developer Conference 2000, 'Online! Jun. 20, 2000, pp. 1-9, XP002317562 Montpellier, France Extrait de l'Internet: URL:http://www.gemplus.com/smart/rd/publications/pdf/Mac00gdc.pdf> 'extrait le Feb. 14, 2005!

Dave A et al: "Proxies, Application Interfaces, and Distributed Systems" Proceedings of the International Workshop on Object Orentation in Operating Systems, XX, XX, Jan. 1992, petes 212-220, XP002004311 p. 213, colonne de droite, ligne 31-47; figure 1, p. 214, colonne de gauche, ligne 25—colonne de droite, ligne 4, p. 214, colonne de droite, ligne 28-32; figure 2, p. 213, colonne de droite, ligne 49-, p. 214, colonne de gauche, ligne 2; figure 2, p. 213, colonne de droite, ligne 11,14.

MacAire A: "An open and secure terminal infrastructure for hosting personal services" Proceedings of the Technology of Object-Oriented Languages and Systems, Jun. 5, 2000, pp. 10-21, XP010500927.

Jean-Jacques Vandewalle: "New RMI Extension to the Java Card? 2.1 API" Java One Conference, 'Online! Jun. 2001, pp. 1-12, XP002317392 San Francisco Extrait de l'Internet: URL:http//www.gemplus.com/smart/rd/publications/pdf/Van01rmi.pdf> 'extrait le Feb. 10, 2005!.

Jean-Jacques Vandewalle: "Construction d?applications avec la carte a puce" 'Online! Aug. 23, 1999, pp. 1-76, XP002317391, Extrait de l'Internet: URL:http//sardes.inrialpes.fr/ecole/1999/cours/99-13.pdf> 'extrait le Feb. 10, 2005! Le document en entire p. 49-p. 6-, p. 64-p. 66.

\* cited by examiner

MICROCIRCUIT CARD COMPRISING MEANS FOR PUBLISHING ITS COMPUTER OBJECTS

The present invention relates to a microcircuit card that can be inserted into a computer system, the card including a host computer system (processor, memories, etc.) and at least one data object (software programs, variables, files, etc.) used by the host system.

In the remainder of the present document, we will use:

the term "terminal" to refer to the computer system, including a microcircuit card reader into which the card is inserted. The terminal may be for example, a personal computer (PC), a telecommunication device (telephone, personal digital assistant, etc.) or a digital data processing system designed to perform a particular kind of processing, for example cryptographic processing;

the term "third-party system" to refer to a computer system connected to the terminal as defined above via a telecommunication network (local area network, Internet, etc.).

In known manner, the Java Card 2.2 standard defines an object language for simplifying the development of software applications executing on a microcircuit card. The host system of the microcircuit card conventionally includes an operating system (OS) etched into a read-only memory (ROM) of the card, this operating system including a Java Card virtual machine (JVM).

According to this standard, the host system of the card and the terminal communicate by means of a standard rudimentary communication protocol.

To be more precise, information exchanged between the host system and the terminal is coded in hexadecimal and placed in a table of bytes that constitutes either a command message from the terminal to the card or a response message from the card to the terminal. A command or response message of this kind is known as an application protocol data unit (APDU).

Unfortunately, the Java Card 2.2 standard does not provide for publishing the list of the data objects accessible on the card.

This constraint makes it very difficult to develop software applications executing on a terminal system or a third-party system. This is because developing software applications executing on that kind of system necessitates fastidious coding of the APDUs, and in particular a knowledge of the hexadecimal codes for addressing the objects of the card. One example of a software application conforming to the Java Card 2.2 standard is set out by way of example in appendix A.

The present invention aims to solve the problems cited above. To be more precise, in accordance with a first aspect, the invention provides a microcircuit card including at least one data object, the card being characterized in that it includes:

a register including a logical identifier of that object and at least one first reference of that object local to the card, and means adapted, on reception of a first message including the logical identifier, to communicate at least one second local reference obtained from the first local reference.

Correlatively, and according to a second aspect, the invention concerns computer equipment of terminal type including means adapted to implement a software application including at least one first instruction for using at least one data object in a microcircuit card, the first instruction using a logical identifier of that object. The terminal is characterized in that it includes means for obtaining, from the logical identifier, at least one second local reference obtained by the microcircuit card from a first reference of the data object local to the card, means for translating the first instruction into at least one second instruction that can be executed on said card, the second instruction using that second local reference, and communication means adapted to communicate the second instruction to the card for said use.

Thus a software application executing on the terminal can include instructions for executing a data object of the card and using a logical identifier of that object instead of a reference local to the card.

Moreover, the software application can include high-level instructions for exchange of information between the terminal and the host system of the card which are translated into APDU messages by the above translation means.

Thus the present invention facilitates the development of software applications executing on the terminal because the developer does not need to know the hexadecimal codes for addressing the objects of the microcircuit card or to code the APDU commands.

A data object of the microcircuit card can in particular be a computer program, a variable or a computer file.

According to one advantageous feature, the microcircuit card further includes means for publication of the logical identifier and of the first local reference in the register of the card.

In a first embodiment, the register of the card is created once and for all, i.e. in static manner at the time of creating the microcircuit card.

On the other hand, in a preferred embodiment of the present invention, the publication means enable dynamic publication of the logical identifier and the first local reference of the data object in the register of the card. Thus only the data objects necessary at a given time are accessible to software applications executing on the terminal.

In a preferred embodiment, the data object is a Java Card type object belonging to a Java Card applet and the second local reference of the data object conforms to the Java Card standard. In this preferred embodiment, the obtaining means of the computer equipment terminal are adapted to obtain the second local reference conforming to the Java Card standard from the microcircuit card.

The publication is preferably performed at the initialization of that applet.

This preferred embodiment leaves it up to the developer of the Java applet executing on the host system of the microcircuit card whether to make each data object of that applet accessible or not to software applications executing on the terminal.

In a variant of the above preferred embodiment, the communication means are adapted to communicate an identifier of the applet on reception of the first message.

Thus in this variant the identifier of the applet is obtained without the programmer having to know its hexadecimal code. According to the Java Card standard, this identifier is needed if it is to be possible to use the data objects of the applet subsequently.

In another preferred variant embodiment of the microcircuit card of the invention, on reception of a second message, the communication means of the card communicate all the logical identifiers included in the register of the card.

This variant is particularly advantageous because it enables the terminal system to know all the data objects published by the microcircuit card and the various versions of those objects.

In a first variant embodiment, the second local reference communicated by the communication means of the microcircuit card is the first local reference of the data object proper.

In a preferred variant embodiment, the second local reference is temporary and is obtained by encrypting the first local reference using an encryption key of the microcircuit card.

Thus the second local reference can be used only for a session defined by the selection of the applet. This preferred variant embodiment makes the card more secure, in accordance with the recommendations of the Java Card 2.2 standard, in order to guard against attack by "replaying", i.e. attacks aiming to make fraudulent use of the object of the card, by re-using its reference, without selecting the applet implementing that object.

In a preferred embodiment, the terminal further includes means for publication, in one of its registers, a buffer object including an interface identical to that of the data object of the card, that buffer object being adapted to translate an instruction executing on a third-party system and using the logical identifier into at least one second instruction that can be executed on the card and uses the second local reference.

This preferred embodiment enables the use of the data objects of the microcircuit card by a software application executing on a third-party system networked with the terminal of the card.

The register preferably conforms to the Java2 SE RMI Registry standard.

In a preferred variant of this embodiment, the publication means obtain and publish in this register of the terminal system all the buffer objects of the data objects published by said card.

This variant is particularly advantageous because it enables the third-party system to know all the data objects published by the microcircuit card and the various versions of those objects.

Figure 2:
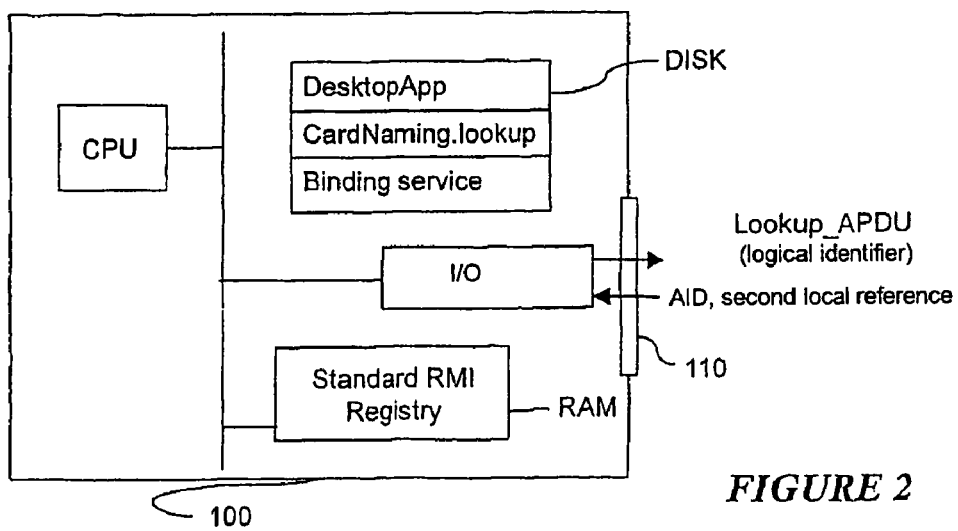

The invention will be better understood and other advantages will become clearer in the light of the following description of a microcircuit card and a computer system terminal conforming to the principle thereof, the description being given by way of example only and with reference to the appended drawings, in which:

FIG. 1 is a block diagram of a microcircuit card conforming to one particular embodiment of the present invention, and FIG. 2 is a block diagram of a computer system terminal conforming to a preferred embodiment of the invention.

Moreover, the description is accompanied by the following appendices:

appendix A: source code of a Java Card applet of the FIG. 1 microcircuit card;

appendix B: first part of the source code of a client code of the computer system terminal from FIG. 2;

appendix C: syntax table of an APDU command for obtaining the identifier of an applet;

appendix D: syntax table of an APDU command for obtaining the reference of an object;

appendix E: syntax table of an APDU command for assigning a value to a data object in conformance with the ISO7816 standard;

appendix F: second part of the source code of a client code of the FIG. 2 computer system terminal;

appendix G: syntax table of an APDU command for executing a program remotely on a microcircuit card; and appendix H: syntax table of an APDU command for obtaining the logical identifiers of all the objects of a microcircuit card.

FIG. 1 represents a microcircuit card 10 conforming to the present invention. The card 10 includes a host data processing system including a processor CPU associated in the conventional way with a read-only memory ROM, a volatile random-access memory RAM, and a non-volatile rewritable memory EEPROM.

The read-only memory ROM contains an operating system OS including a Java Card virtual machine JVM.

The microcircuit card 10 includes input-output means I/O adapted to send digital data to a terminal and to receive digital data from that terminal.

The input-output means I/O consist, for example, of a serial port known to the person skilled in the art.

The microcircuit card 10 described here contains three data objects.

As known to the person skilled in the art, an object conforming to the Java Card standard is a special case of a computer program. For simplicity, and by convention, in the remainder of this document an object may be regarded as a computer program.

Thus the microcircuit card 10 includes a first data object, namely a computer program belonging to a Java Card applet CalculatorApplet whose code (see appendix A) is stored in a rewritable memory EEPROM.

This data object includes a first reference 0060H local to the card 10 and conforming to the Java Card standard. In the prior art, the programmer of a software application executing on the terminal has to use this reference 0060H to execute this program on the card.

According to the present invention, computer program also includes a logical identifier "myCalculator" that can be used by a programmer of the computer system terminal in place of the reference 0060H.

The microcircuit card 10 contains a second data object, namely a file stored in the non-volatile rewritable memory EEPROM.

Note first that the term "file" as used in the present document must be understood in a broad sense, designating either a file or a directory. In particular, the term "file" is used to designate a directory DF (Dedicated File) and a file EF (Elementary File) in the sense of the ISO7816 standard.

As known to the person skilled in the art of microcircuit cards, the file includes, in accordance with the ISO7816 standard, a first reference local to the card known as the FID (File Identifier) and coded in hexadecimal on two bytes, in the present example "3F00H".

According to the present invention, this file comprises a logical identifier "CARD_HOLDER".

The microcircuit card 10 includes a third data object, namely a variable (or "object data") in a register of the rewritable memory EEPROM.

That variable includes a first reference local to the card coded in hexadecimal on two bytes, in the present example "0050H". It is assumed that this variable is used to store a date.

According to the present invention, this variable includes a logical identifier, here the character string "date".

According to the present invention, the microcircuit card contains a file 20 storing a table including one row for each data object accessible by a software application executing on a computer system terminal or on a third-party computer system.

Each row in the table in the file 20 includes:

a record including the logical identifier of the data object, and a record including a first reference of that object local to the card.

The microcircuit card 10 includes an application CardManager stored in the read-only memory ROM, for example.

In known manner, the application CardManager is adapted, using the input-output means I/O, to exchange messages consisting of APDU commands and responses with the computer system terminal into which the microcircuit card is inserted.

It is adapted in particular to receive from the above terminal a message Lookup_APDU including the logical identifier of a data object.

The application CardManager is also adapted, using the file 20, to communicate a second local reference of the data object to the terminal on reception of the message Lookup_APDU.

To be more precise, the application CardManager extracts the logical identifier contained in the APDU message, looks in the file 20 for the row containing that logical identifier in its second column, and obtains the first local reference contained in the second column of the same row.

In an embodiment described here, the first local reference obtained in this way is then encrypted using a function K that uses an encryption key KEY stored in the rewritable memory EEPROM, which makes it possible to obtain a second local reference communicated to the terminal by the application CardManager.

Alternatively, the second local reference communicated to the terminal is the first local reference itself.

In the preferred embodiment, the communication means are adapted, on reception of a message including the logical identifier of a data object conforming to the Java Card 2.2 standard, to communicate the identifier AID of the Java Card applet CalculatorApplet including that data object, for example the reference A000000000H.

Thus, on reception of a message including the logical identifier "myCalculator", the communication means communicate the identifier AID A000000000H of the Java applet CalculatorApplet and the second local reference K(0060H)=0460h obtained by encrypting the local reference 0060H using the key KEY.

The application CardManager also supplies the name Calculator of the interface of the data object.

Moreover:

on reception of a message including the logical identifier "CARD_HOLDER", the communication means communicate the second local reference K(0004H); and on reception of a message including the logical identifier "date", the communication means communicate the second local reference K(0050H).

In a first embodiment, the file 20 is constructed statically at the time of creating the card. For example, it is a table stored in the read-only memory ROM.

In the preferred embodiment described here, the file 20 is updated dynamically. To this end, the microcircuit card 10 includes means for publication the logical identifier and the first local reference in the file 20 of the card.

Here the publication means consist of a computer program Binding_API stored in read-only memory ROM and including a computer instruction bind, one example of the use of which, for publishing the program "myCalculator", is given in line A33 of appendix A.

As described here with reference to appendix A, this publication is preferably performed on initialization of the Java applet CalculatorApplet.

A computer equipment 100 of terminal type and conforming to the present invention is described next with reference to FIG. 2.

In the present example, the terminal 100 is a personal computer PC including means 110 for inserting a microcircuit card 10 as described above with reference to FIG. 1.

The terminal 100 includes in particular means known in the art for implementing a software application, namely a processor CPU associated with ROM and RAM and a hard disk drive DISK.

The terminal 100 also includes input-output means I/O adapted to send digital data to and to receive data from a microcircuit card of the invention.

The input-output means I/O consist, for example, of a serial port known to the person skilled in the art.

According to the present invention, the terminal 100 can implement a software application DesktopApp stored on the hard disk drive DISK and including at least one first instruction for using a data object in a microcircuit card, that first instruction using the logical identifier of that object.

The code of the software application DesktopApp is set out in lines B21 through B31 of appendix B. That code includes in particular a line B23 using the logical identifier "myCalculator" of the computer program defined above with reference to FIG. 1.

In order to be able to use that logical identifier, and to ensure compatibility with the Java Card 2.2 standard, the computer equipment terminal 100 includes means for obtaining a second local reference from that logical identifier, through cooperation with the input-output means I/O. The second local reference is obtained by the microcircuit card 10 from a first reference of the data object local to the microcircuit card.

In the embodiment described here, the means for obtaining are provided by a program CardNaming.lookup stored on the hard disk drive DISK and whose source code is set out in lines B12 through B20 of appendix B.

In the embodiment described here, the means for obtaining first obtain the identifier AID of the applet CalculatorApplet including the data object:

(B14):byte[]AID=CardNaming.cardManagerLookup ("myCalculator");

In the example described here, the method CardNaming.cardManagerLookup constructs a first APDU command containing the logical identifier myCalculator and sends that APDU command to the card.

The card responds by sending back the corresponding AID identifier, i.e. the value A000000000H.

This first APDU command causes execution on the card of the instruction Lookup_AID of the application CardManager which obtains from the file 20 the value of the AID associated with the logical identifier myCalculator.

In a known manner (after sending an APDU command for selecting the application CardManager, in accordance with the ISO7816 standard), the first APDU command is sent by the method CardNaming.cardManagerLookup using the class CardService predefined by the OCF (Open Card Framework) consortium for sending APDUs to a card. The syntax of this APDU command is set out in appendix C.

In a second stage, the program CardNaming.appletLookup sends a second APDU command with two input parameters, namely the identifier AID (A000000000H) of the applet obtained previously and the logical identifier myCalculator of the data object of the card.

The program CardNaming.appletLookup obtains in return the temporary second local reference K(0060H)=0460h obtained by encryption from the first local reference 0060H of that object on the microcircuit card.

(B15) byte[]ref=CardNaming.appletLookup(AID, "myCalculator");

This second APDU command, whose syntax is set out in appendix D, causes the execution on the card of the instruction lookup_reference of the application CardManager that obtains from the file 20 the first local reference 0060H associated with the logical identifier myCalculator and then calculates the second local reference 0460h.

The computer equipment terminal 100 further includes means for translating the first instruction into at least one second instruction that can be executed on said card, that second instruction using said at least one second local reference.

Thus for example, if the software application DesktopApp wishes to modify the content of the variable of the microcircuit card 10 whose logical identifier is "date" with the value "01/01/2002", the translation means generate a second instruction in the form of a command Put_data APDU, whose syntax is set out in appendix E. That instruction uses the first local reference 0050H of that object.

In the embodiment described here, the translation means consist of a proxy object created from the second local reference of the object (0460H) previously obtained. In this embodiment, the proxy object is an instance of the class Proxy known to the person skilled in the art and defined by the Java 2™ platform Standard, Edition V1.3.

According to the Java 2™ platform, Standard Edition V1.3, a class CardHandler is constructed that includes a method invoke for translating method calls in cooperation with the object proxy. The method invoke uses the class CardService defined by the OCF (Open Card Framework) consortium. The pseudocode of the class CardHandler is set out in lines B1 to B11 of appendix B.

In the example described here, the object proxy is constructed (lines B16 and B17) and returned (line B18) by the method CardNaming.lookup.

Accordingly, after execution of the instruction of line B23 of appendix B, an object calculator is created in the terminal and enables translation of instructions using the data object of the card whose logical reference is "myCalculator".

The second reference ref local to the card of the translation object calculator is stored by the manufacturer of the class CardHandler described above (line B4, appendix B).

The translation object calculator may then be used in a program of the terminal to execute methods of the object of the microcircuit card whose logical reference is "myCalculator".

For example, the developer of this kind of program can write line B24 of appendix B to execute addition of the numbers 5 and 6 on the microcircuit card.

On execution of the instruction from the line B24, the method Invoke of the object CardHandler described above creates and sends the APDU command Invoke conforming to the Java 2.2 standard. The syntax of this command is set out in appendix G.

The applet CalculatorApplet has been selected beforehand, at the time of execution of the line B15.

According to the Java Card 2.2 standard, the instruction invoke communicated in this way to the applet CalculatorApplet by means of the APDU command initiates execution of the method add with the parameters 5 and 6.

The present invention further enables a software application executing on a third-party system to access a data object of the microcircuit card using its logical identifier when the card is inserted into a terminal connected to the third-party system via a telecommunication network.

To this end, and in a preferred embodiment, the computer equipment terminal 100 includes means for publication in a register Standard RMI Registry of a volatile random-access memory RAM of the terminal a buffer object remoteCalculator having an interface identical to that of the data object of the microcircuit card and enabling an application executing on a third-party system to use that data object.

To this end, an intermediate object calculator_invoker is first created (line B25, appendix B) from the translation object calculator described above.

The object calculator_invoker belongs to the class InvokerImpl, which is itself a class UnicastRemoteObject known to the person skilled in the art and implementing the Java SE 1.3 RMI mechanisms. The code of the class InvokerImpl is set out in appendix F, lines F3 to F8.

In known manner, the intermediate object calculator_invoker includes the translation object calculator and a method invokeMethod, that method invokeMethod implementing a mechanism for translating calls to methods of the object calculator using the reflectivity mechanism of the Java language (line F7).

The object calculator_invoker created in line B25 is an RMI object stored in the register Standard RMI Registry of the terminal but does not have the methods of the data objects on the microcircuit card. In particular, it does not have the method add.

To enable use of that method by an application executing on a third-party system, there is stored in the register Standard RMI Registry of the terminal the buffer object remoteCalculator (lines B27 to B29) that implement the methods of the object of the card whose logical identifier is "myCalculator", the object remoteCalculator being also identified by the logical identifier "myCalculator" (line B29). The object remoteCalculator contains also the logical identifier and the RMI call means to the intermediate object calculator_invoker, as can be seen in the code of the class InvokeHandler, lines F9 to F15. The buffer object remoteCalculator is adapted, by calling on the object calculator_invoker, to translate an instruction that is executed on the third-party system and using said logical identifier into at least one second instruction that can be executed on said card using the second local reference (0460H).

Thus two objects are stored in the register Standard RMI registry of the terminal, namely the intermediate object calculator_invoker under the identifier "myCalculator_Invoker" (line B26) and the buffer object remoteCalculator with the logical identifier "myCalculator" (line B29).

Accordingly, if a software application of the third-party system executes the following instruction:

Calculator calculator_third_party=(Calculator)Naming.lookup("myCalculator")

the Java 2 SE method Naming.lookup reads the buffer object remoteCalculator in the register Standard RMI registry of the terminal system, reconstructs it in the third-party system, and assigns it to the object calculator_third_party.

The software application of the third-party system can then use the object calculator_third-party to access the corresponding object of the microcircuit card 10 via the intermediate object calculator_invoker of the terminal system.

Thus the data objects of the microcircuit card 10 can be used on a third-party computer system networked to the computer system terminal 100.

In the preferred embodiment described here, the terminal system also supplies the publication means described above for the publication of the object calculator in the form of a class Java BindingService whose principal instructions, necessary for understanding the invention, are set out in appendix F, lines F16 to F30.

The publication means BindingService are in particular adapted to obtain and to publish in the register standard RMI Registry of the terminal all the buffer objects of the data objects published by the microcircuit card.

In the preferred embodiment described here, the publication means BindingService use for this purpose the APDU command get_bound_objects_APDU whose syntax is set out in appendix G.

APPENDICES

APPENDIX A

| | |
|---|---|
| A1 | public interface Calculator extends Remote { |
| A2 | short add (short a, short b) throws RemoteException; |
| A3 | } |
| A10 | public class CalculatorImpl extends CardRemoteObject implements Calculator { |
| A11 | public CalculatorImpl ( ) { super ( ); } |
| A12 | short add(short a, short b) throws RemoteException { |
| A13 | return (short) (a+b); |
| A14 | } |
| A15 | } |
| A20 | public class CalculatorApplet extends Applet { |
| A21 | private Dispatcher dispatcher; |
| A22 | private final static byte CALCULATOR = { (byte)m, (byte)y, (byte)C, (byte)a, (byte)l, |
| A23 | (byte)c, (byte)u, (byte)l, (byte)a, (byte)t, (byte)o, (byte)r }; |
| A30 | private CalculatorApplet{ |
| A31 | Calculator calculator = new CalculatorImpl ( ); |
| A32 | OCSRMIService rmi = new OCSRMIService (calculator) ; |
| A33 | RMIRegistry.bind (CALCULATOR, (short) 0, (byte) CALCULATOR.length, |
| A34 | calculator) ; |
| A35 | dispatcher = new Dispatcher(1); |
| A36 | dispatcher.addService(rmi, Dispatcher.PROCESS_COMMAND); |
| A37 | } |
| A40 | public static void install(byte[ ] buffer, short offset, byte length) { |
| A41 | (new CalculatorApplet( )).register( ); |
| A42 | } ; |
| A50 | public void process (APDU apdu) (install(byte[ ] buffer, short offset, byte length) { |
| A51 | dispatcher.process (apdu); |
| A52 | } |
| A53 | } |

APPENDIX B

| | |
|---|---|
| B1 | class CardHandler implements Invocation Handler { |
| B2 | private byte[ ] ref; |
| B3 | CardHandler(byte[ ]ref) { |
| B4 | this.ref=ref; |
| B5 | } |
| B6 | public Object invoke (Object proxy, Method method, Object[ ]params) { |
| B7 | /* Translation code of the call to the method "method" */ |
| B8 | /* Construction of an APDU, using ref to start execution of the method "method" on the card */ |
| B9 | /* Sending of the APDU to the card and recovery of the response returned by the method */ |
| B10 | } |
| B11 | } |
| B12 | class CardNaming { |
| B13 | public static Remote lookup(String name) { |
| B14 | byte aid[ ] = CardNaming.cardManagerLookup (name); |
| B15 | byte ref[ ] = CardNaming.appletLookup(aid, name); |
| B16 | Cardhandler ch = new Cardhandler(K(ref)); |
| B17 | Remote proxy = (Remote) Proxy.newProxyInstance(..., ch, ... ); |
| B18 | return proxy; |
| B19 | } |
| B20 | } |
| B21 | public class DesktopApp { |
| B22 | void main (String [ ] args) { |
| B23 | Calculator calculator = (Calculator) CardNaming.lookup |

APPENDIX B-continued

| | |
|---|---|
| | ("myCalculator"); |
| B24 | short result = calculator.add((short) 5, (short 6); |
| B25 | InvokerImpl calculator_invoker = new InvokerImpl(calculator); |
| B26 | Naming.bind("myCalculator_invoker", calculator_invoker); |
| B27 | InvokerHandler handler = new InvokerHandler("myCalculator_invoker"); |
| B28 | Remote remoteCalculator = Proxy.newProxyInstance(...., handler,...); |
| B29 | Naming.bind("myCalculator", remoteCalculator); |
| B30 | } |
| B31 | } |

APPENDIX C

AID Lookup APDU

| Field name (ISO 7816) | Hexadecimal value | Description of the content of the field |
|---|---|---|
| CLA | 80 h | Proprietary call class |
| INS | 42 h | Instruction lookup_AID |
| P1 | 00 h | No parameter |
| P2 | 00 h | No parameter |
| Lc | 0 Ch | Length of the logical identifier myCalculator |
| Data field | 6D7943616C63756C61746F72 h | Logical identifier myCalculator coded in UTF-8 format |
| Le | 00 h | Expected size of the response unknown |

APPENDIX D

Reference Lookup APDU

| Field name (ISO 7816) | Hexadecimal value | Description of the content of the field |
|---|---|---|
| CLA | 80 h | Proprietary call class |
| INS | 40 h | Instruction lookup reference |
| P1 | 00 h | No parameter |
| P2 | 10 h | Special parameter |
| Lc | 0 Ch | Length of the logical identifier |
| Data field | 6D7943616C63756C61746F72 h | Logical identifier coded in UTF-8 format |
| Le | 00 h | Expected size of the response unknown |

APPENDIX E

Put data APDU

| Field name (ISO 7816) | Hexadecimal value | Description of the content of the field |
|---|---|---|
| CLA | 80 h | Proprietary call class |
| INS | Da h | Instruction Put data |
| P1 | 00 h | First byte of the tag date |
| P2 | 50 h | Second byte of the tag date |
| Lc | 04 h | Length of date Jan. 1, 2002 |
| Data | 01012002 h | Date Jan. 1, 2002 |

APPENDIX F

| | |
|---|---|
| F1 | public interface Invoker extends Remote { |
| F2 |     public Object invoke (OMethod method, Object[ ] args);) |
| F3 | public class InvokerImpl extends UnicastRemoteObject implements Invoker { |
| F4 |     private Remote cardObject; |
| F5 |     InvokerImpl(Remote cardObject) {Super( ); this.cardObject = cardObject;} |
| F6 |     public Object invokeMethod(String method, Object[ ] args) { |
| F7 |         /** use Reflectivity **/   } |
| F8 | } |
| F9 | public class InvokerHandler implements InvocationHandler, Serializable { |
| F10 |     private String invokerName; |
| F11 |     InvokerHandler(String invokerName) {this.invokerName = invokerName;} |
| F12 |     public Object invoke(Object proxy, Method method, Object[ ] args) { |
| F13 |       Invoker invoker = Naming.lookup(invokername); |
| F14 |       return invoker.invokeMethod(getString(method), args); } |
| F15 | } |
| F16 | public class BindingService { |
| F17 |     public static main(String[ ] args) { |
| F18 |       String registryURL = args[1]; |
| F19 |       Iterator iterator = getBoundObjects( ); |
| F20 |       while (iterator.hasNext( )) { |
| F21 |         String name = (String)iterator.next( ); |
| F22 |         Remote cardObject = CardNaming.lookup(name); |
| F23 |         InvokerImpl invoker = new InvokerImpl(cardObject); |
| F24 |         String invokerName = registryURL + name + "_Invoker"; |
| F25 |         Naming.bind(invokerName, invoker); |
| F26 |         InvokerHandler handler = new Invokerhandler(invokerName); |
| F27 |         Remote remoteObject = Proxy.nexProxyInstance( . . . , handler, . . . ); |
| F28 |         Naming.bind(registryURL + name, remoteObject); |
| F29 |     } |
| F30 | } |
| F31 | } |

APPENDIX G

Invoke APDU

| Field name (ISO 7816) | Hexadecimal value | Description of the content of the field |
|---|---|---|
| CLA | 80 h | Proprietary call class |
| INS | 38 h | Instruction Invoke |
| P1 | 02 h | First byte of version Java Card |
| P2 | 02 h | Second byte of version Java Card |
| Lc | 08 h | Length of data |
| Data | 0460 A7F6 0005 0006 h | Data: reference (2 bytes), method add (2 bytes), parameter "5" (2 bytes) and parameter "6" (2 bytes) |

APPENDIX H get bound objects APDU

| Field name (ISO 7816) | Hexadecimal value | Description of the content of the field |
|---|---|---|
| CLA | 80 h | Proprietary call class |
| INS | 44 h | Instruction get bound objects |
| P1 | 00 h | No parameter |
| P2 | 00 h | No parameter |
| Le | 00 h | Expected size of the response |

The invention claimed is:

1. A microcircuit card comprising:
a processor;
at least one data object associated to at least one first hexadecimal reference local to the card to locally address and execute the data object;
a register comprising a logical identifier of said object and the at least one first hexadecimal local reference; and
a means adapted, on reception of a first message from a separate external terminal receiving said microcircuit card, said message comprising said logical identifier of the data object, to communicate to the external terminal at least one second local hexadecimal reference of the data object through which the terminal can address the data object to the microcircuit card and that is obtained from said at least one first local hexadecimal reference, and on reception of another message comprising the second local hexadecimal reference from the external terminal, to execute the data object based on the second local hexadecimal reference comprised in the received message,
wherein the execution of the data object is performed with only the card directly accessing the data object.

2. The microcircuit card according to claim 1, further comprising a means for publication of said logical identifier and of said at least one first local hexadecimal reference in said register of the card.

3. The microcircuit card according to claim 2, wherein said data object is an object oriented interpretive language card type object belonging to an object oriented interpretive language card applet, the card being wherein said second local hexadecimal reference of said data object conforms to the Java Card standard.

4. The microcircuit card according to claim 3, wherein said publication is performed at the initialization of said applet.

5. The microcircuit card according to claim 3, wherein the communication means are adapted to communicate an identifier of said applet on reception of said first message.

6. The microcircuit card according to claim 1, wherein said data object is a computer program, a variable or a computer file.

7. The microcircuit card according to claim 1, wherein on reception of a second message, said communication means communicate all the logical identifiers contained in said register.

8. The microcircuit card according to claim 1, wherein said second local hexadecimal reference is said first local hexadecimal reference.

9. The microcircuit card according to claim 1, wherein said second local hexadecimal reference is temporary and is obtained by encrypting the first local hexadecimal reference using an encryption key of the microcircuit card.

10. The microcircuit card according to claim 1, wherein said data object is a Java Card type object belonging to an object oriented interpretive language card applet, the card being wherein said second local hexadecimal reference of said data object conforms to the Java Card standard.

11. The microcircuit card according to claim 1, wherein the first message comprises the logical identifier of the data object is an application protocol data unit message.

12. A computer equipment of terminal type including means adapted to implement a software application including at least one first instruction for using at least one data object in a separate microcircuit card inserted into the computer equipment, said at least one first instruction uses a logical identifier of said object and the computer equipment comprising:

a means for obtaining via processor, from said logical identifier, at least one second local hexadecimal reference of the data object, obtained by the separate microcircuit card upon insertion from a first hexadecimal reference of said data object local to said card, said first local hexadecimal reference being associated to the data object to locally address and execute the data object within the card, the execution of the data object is performed with only the card directly accessing the data object;

a means for translating said at least one first instruction into at least one second instruction that can be executed on said card, said at least one second instruction using said at least one second local hexadecimal reference, and a communication means adapted to communicate said at least one second instruction to said card for use.

13. The computer equipment according to claim 12, wherein said data object is a Java Card type object belonging to an object oriented interpretive language card applet of the separate microcircuit card, which computer equipment is wherein the obtaining means are adapted to obtain a second hexadecimal reference conforming to an object oriented interpretive language card standard obtained by said card from a first hexadecimal reference of said data object.

14. The computer equipment according to claim 12, wherein the obtaining means are adapted to obtain an identifier of an applet.

15. The computer equipment according to claim 12, wherein said data object is a computer program, a variable or a computer file.

16. The computer equipment according to claim 12, wherein it further comprising a means for publication, in a register of said computer system terminal, a buffer object including an interface identical to that of the data object of the card, that buffer object being adapted to translate an instruction executing on a third-party system and using said logical identifier into at least one second instruction that can be executed on said card and uses said second local hexadecimal reference.

17. The computer equipment according to claim 16, wherein the publication means are adapted to obtain and to publish in the register of said computer system terminal all the buffer objects of the data objects published by said card.

18. The computer equipment according to claim 16, wherein said data object is an object oriented interpretive language card type object and said register conforms to a remote method invocation standard for an object oriented interpretive language.

19. The computer equipment according to claim 17, wherein said data object is a Java Card type object and said register conforms to a remote method invocation standard for an object oriented interpretive language.

20. The computer equipment according to claim 12, wherein the means for obtaining are configured to obtain the second local hexadecimal reference using application protocol data unit messages exchanged with the card.

* * * * *